Nov. 1, 1960     L. H. HORNBROOK, JR     2,958,226
CONTROL MECHANISM
Filed Sept. 14, 1959
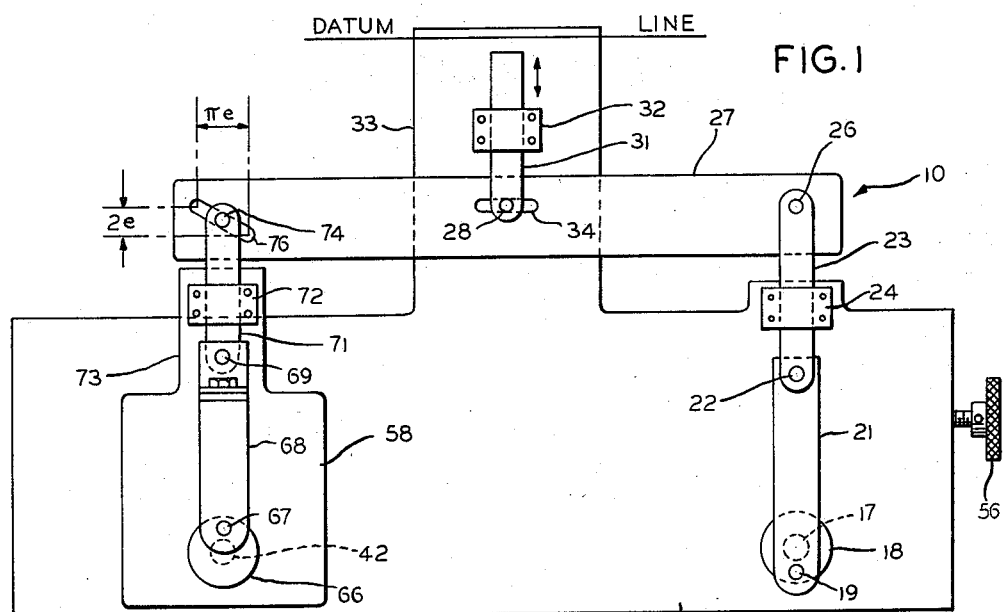
FIG.1
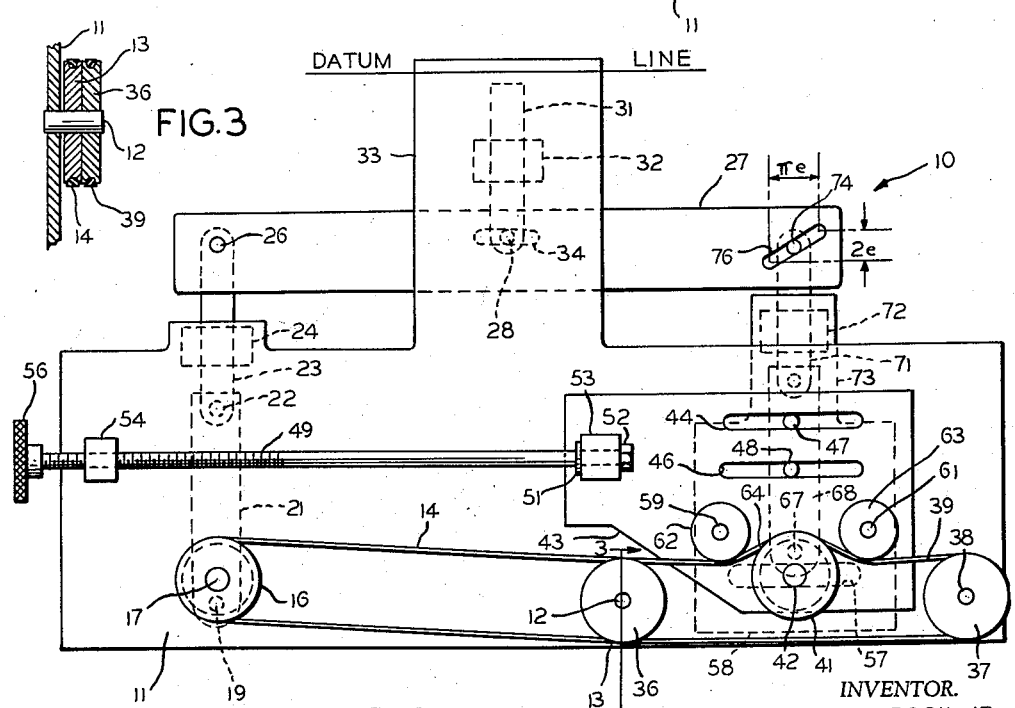
FIG.3
FIG.2
INVENTOR.
LESTER H. HORNBROOK JR.
BY
ATTORNEY

United States Patent Office 2,958,226
Patented Nov. 1, 1960

2,958,226

CONTROL MECHANISM

Lester H. Hornbrook, Jr., 811 Chilton Lane, Wilmette, Ill.

Filed Sept. 14, 1959, Ser. No. 839,809

10 Claims. (Cl. 74—25)

This invention relates generally to control mechanisms and has particular reference to a control mechanism for controlling the length of the stroke of a powered device having reciprocating motion.

According to the present invention, mechanism is provided for changing the rotary motion of a shaft into a powered straight line reciprocating motion, the amplitude of which can be varied as desired. Moreover, the variation in amplitude of the powered reciprocating device is measured from a common datum located at one end of the stroke. The device according to the present invention finds application, for example, in a control mechanism for sweeping a known volume of fluid from a hydraulic cylinder during each stroke of the device.

With the foregoing considerations in mind, it is a principal object of this invention to provide a control mechanism which will vary the effective stroke of a reciprocating powered device, the length of such stroke being measured from a common datum located at a starting point for such stroke.

Another object is to convert the rotary motion of a driving shaft into a powered rectilinear motion and to vary the amplitude of such motion as desired.

Still another object is to provide a device which will vary the length of the stroke of a powered device by varying the stroke of a link connected to a pair of eccentrics driven by the rotating powered device, one of such eccentrics being angularly shiftable with respect to the other eccentric, so as to vary the reciprocating motion of said link.

Yet another object comprehends a control mechanism having a pair of powered rotating shafts which are spaced from each other, one of the shafts driving an eccentric, the two shafts being connected drivably and the driving means therefor being adapted to vary the angular position, of a second eccentric connected to the first eccentric by means of a link having a varied reciprocating motion.

Other objects and important features of the invention will be apparent from a study of the specification following taken with the drawing, which together describe and illustrate a preferred embodiment of the invention, and what is now considered to be a best mode of practicing the principles thereof. Other embodiments of the invention may be suggested to those having the benefits of the teachings herein and such other embodiments are intended to be reserved especially as they fall within the scope and spirit of the subjoined claims.

In the drawings:

Fig. 1 is an elevational view of a control device embodying the improvements according to the present invention;

Fig. 2 is an elevational view of the opposite side of the device seen in Fig. 1; and Fig. 3 is a section taken along the line 3—3 of Fig. 2 looking in the direction of the arrows.

Referring now to the drawing, the improved control mechanism according to the present invention is referred to generally by the reference numeral 10, and includes a base plate 11 having a driving shaft 12 journalled therein, means not shown being provided for driving the shaft 12, which is shown as having a sprocket 13 driving a sprocket chain 14 trained about a driven pulley 16 supported on a stub shaft 17 also journalled in the base plate 11.

The sprocket 16 is fast on the shaft 17 which also has a crank 18 fast thereon, the crank 18 being disposed on the opposite side of the base plate 11 as seen in Fig. 1. The crank 18 includes a crank pin 19, which is connected to a connecting rod 21. A pivotal connection 22 is provided between the connecting rod 21 and a follower 23 having reciprocating motion within a guide 24 secured to the base plate 11. The follower 23 is connected pivotally at 26 to a link 27. The link 27 is connected by a pin 28 to a reciprocating device 31 which reciprocates within a guide 32 disposed on an extension 33 from the base plate 11.

A slot 34 in the link 27 enables the powered device 31 to have movement longitudinally of the link 26 as may be necessary by the variable reciprocating motion of the link 27 as will now be described.

Structure is provided for varying the amount of reciprocating motion of the end of the link 27 remote from where the follower 23 is connected thereto. The driving shaft 12 accordingly has a sprocket 36 fast thereon of a diameter identical to sprocket 16, sprocket 36 being spaced from an idler sprocket 37 turning upon a stub shaft 38 extending from the base plate 11. A sprocket chain 39 is trained between the sprockets 36 and 37 as seen in Fig. 2.

The driving mechanism consisting of sprockets 13, 16, 36 and 37 and chains 14 and 39, may, if desired, be substituted by timing pulleys and timing belts. It is contemplated also that V-belts may be employed with conventional V-type pulleys as long as there is no slip between the V-belts and their pulleys.

However, for exactness in the variation of the timing as will now be described, it is preferred that there be employed either sprockets and sprocket chains or timing pulleys and timing belts as previously referred to.

The timing chain 39 cooperates with a timing sprocket 41 fast on a stub shaft 42 extending from a movable plate 43 having spaced slots 44 and 46 therein. Slots 44 and 46 cooperate respectively with spaced guide pins 47 and 48 extending from base plate 11.

The movable plate 43 can be adjusted in position with respect to the base plate 11 by an adjusting screw 49 provided with a stop collar 51 and a holding nut 52 which embrace an abutment 53 on the movable plate 43. The adjusting screw 49 is threadably engaged with a lug 54 on the base plate 11, and has a knurled hand wheel 56 for turning the same.

Structure is provided for varying the motion of the link 27 and to thereby vary the amplitude of the rectilinear motion of the powered device 31, and to this end the stub shaft 42 supporting the sprocket 41 is arranged to move translatively within a slot 57 in the base plate 11. The stub shaft 42 is also supported in a plate 58, which is moved by the adjusting screw 49 and guided by the slot 57 and the stub shaft 42.

The plate 58 has stub shafts 59 and 61 extending therefrom and forming supports respectively for idler sprockets 62 and 63. These are mounted on the plate 58 and stub shafts 59 and 61 on each side of the sprockets 41, and form a bight 64 in the sprocket chain 39 about the pulley 41.

As seen particularly in Fig. 1, the stub shaft 42 has a crank 66 which is fast thereto, crank 66 being provided with a throw 67. A connecting rod 68 is connected to the throw 67 and is pivotally connected at 69 to a reciprocating follower 71 which reciprocates in a guide 72 disposed upon an extension 73 from the plate 58. The reciprocating follower 71 is connected to the link 27 by means of a pin 74 engaged within the slot 76 on the link 27.

The hand wheel 56 on the adjusting screw 49 may thus be turned to vary the position of the movable plate 43. The position of the stub shaft 41 between sprockets 36 and 37 is accordingly varied. Such movement of the stub accordingly shifts the position of the crank 66 on the stub shaft 42, and the angular position of crank 66 with respect to the timing sprocket 36 is thus varied. The movement of the movable plate 43 causes the crank throw 67 to vary its position relative to the crank throw 19 on the crank 18.

The amount of translative movement of the movable plate 43 and the stub shaft 42 may preferably be limited to a distance equal to the value of $\pi$ (pi) times the eccentricity of the crank throw 67 or 19. Referring back to the link 27 the slot 76 has a length related to the aforesaid value of $\pi$ (pi) times the eccentricity of the throw 67. The dimension of the slot 76 is also related to a value equal to twice the eccentricity of the throw 67. As seen in the figures, these values are dimensioned upon the slot 76, and as seen, the movement of the plate 58 in the slot 57 and the movement of the stub shaft 42 along an axis parallel to a line of centers between the shafts 12 and 38, is of an amount equal to $\pi$ (pi) times the eccentricity $e$ or $\pi e$. During such total movement within the slot 57 the crank throw 67 has shifted its position with reference to the crank throw 19 a distance equal to twice the eccentricity of the throw 67 or a distance $2e$.

Assume now that the movable plate 43 has been indexed to a position where the plate 58 is at its leftmost position and crank throws 19 and 67 are positioned with respect to each other with zero degrees of angular displacement. Under such condition, the movement of the reciprocating device will be a maximum, its total displacement being equal to two times the eccentricity of the throws 67 and 19, which for purposes of description herein may be assumed as being equal. Such displacement of the device 31 can be measured from an origin or datum which is shown herein as a "datum line" as marked on Figs. 1 and 2.

Consider now the condition obtaining as the screw 49 is turned to move the plate 58 from its leftmost position to the right a distance equal to $$\frac{\pi e}{2}$$

which would correspond to 90° of shifted angle of the crank throw 67 with respect to the crank throw 19. At such time the pin 74 engaged within the slot 76 will occupy a position midway of the length of the slot 76, and while the total amplitude of movement of the pin 74 will not be changed its distance with reference to the pin 28 at the device 31 will be changed. The movement of the pin 74 considered with the movement of the pin 26 at the other end of the link 27 will thus cause a difference in amplitude of the device 31.

However, the change in the amplitude of the device 31 will not be measured from the midpoint of such stroke but from the common datum line indicated.

Consider now the operation obtaining when the plate 43 has been shifted to a position of $\pi$ (pi) times the eccentricity $e$ at which time crank throw 19 will be displaced 180° from the crank throw 67. At such time the pin 74 engaged within the slot 76 will be at the extreme right end thereof, and since the two crank throws 19 and 67 are now phased 180° apart, the link 27 connecting the two reciprocating members 23 and 71 will have only an oscillatory motion about the pin 28, and there will therefore be no reciprocating movement to the device 31.

The device 31 at such time can be considered as being stationary at the datum line shown, and it is believed evident that when the plate 43 is shifted to positions between the two extremes mentioned, the device 31 will have amplitude of motion, the amount of which will be varied in accordance with the position of the plate 43.

The device 31 receives its power from the shaft 12 through the mechanism described, and the device 31 can be connected to any device where it is desired to have reciprocating movement measured from a common datum or reference point. For example, the device 31 can be connected to the piston rod of an hydraulic cylinder and piston arrangement, and the arrangement can be such that the movement of the piston is from a datum corresponding to the end of the cylinder, such as at the cylinder head end thereof. By varying the stroke as before described, a known volume of fluid can be swept with each cycle of the piston within the cylinder.

The foregoing example wherein the device 31 is connected to the piston rod of a piston and cylinder arrangement is by way of illustration only, and the device can be connected to other systems where it is desired to have varying reciprocating movement measured from a common datum line at the end of the stroke.

While the invention has been described in terms of a preferred embodiment, thereof, its scope is not intended to be limited to such embodiment, other embodiments being intended to be reserved especially as they fall within the scope of the claims here appended.

I claim:

1. In a control mechanism for imparting variable reciprocating motion to a powered device where the amplitude of movement of said device is measured from a datum at one end of the stroke of such powered device for all amplitudes of movement thereof, a driving shaft and a driven shaft, a sprocket chain trained between said shafts, a crank mounted on said driving shaft, a sprocket engaging said sprocket chain between said driving and driven shafts, a frame for supporting said sprocket for movement between said shafts along an axis parallel to the line of centers of said shafts, means for moving said frame, a crank mounted on said sprocket including a reciprocating member connected to each connecting rod, a link pivotally connected at each end to a reciprocating member, said powered device being connected to said link, means for shifting said frame and said sprocket to vary the angular displacement of the sprocket supported crank with respect to the other crank, and means on said link for varying the point of connection of the connecting means between said crank driven by said endless strand and said link, comprising a slot in said link having a projected dimension in a direction parallel to the movement of said frame and sprocket equal to $\pi$ (pi) times the eccentricity of the crank supported thereon, and having a projected dimension normal to the first dimension equal to twice the eccentricity of said crank.

2. In a control mechanism for imparting variable reciprocating motion to a powered device where the amplitude of movement of said device is measured from a datum at one end of the stroke of such powered device for all amplitudes of movement thereof, a driving shaft and a driven shaft, a sprocket chain trained between said shafts, a crank mounted on said driving shaft, a sprocket engaging said sprocket chain between said driving and driven shafts, a frame for supporting said sprocket for movement between said shafts along an axis parallel to the line of centers of said shafts, means for moving said frame, a crank mounted on said sprocket, a connecting rod connected to each sprocket including a reciprocating member connected to each connecting rod, a link pivotally connected at each end to a reciprocating member, said powered device being connected to said link, means for shifting said frame and said sprocket to vary the angular displacement of the sprocket supported crank with respect to the other crank, and means on said link for varying the point of connection of the connecting means between the crank driven by said endless strand and said link.

3. In a control mechanism for imparting variable reciprocating motion to a powered device where the amplitude of movement of said device is measured from a datum at one end of the stroke of such powered device for all amplitudes of movement thereof, a driving shaft and a driven shaft, a sprocket chain trained between said shafts, a crank mounted on said driving shaft, a sprocket engaging said sprocket chain between said driving and driven shafts, a frame for supporting said sprocket for movement between said shafts along an axis parallel to the line of centers of said shafts, a crank mounted on said sprocket including a reciprocating member connected to each connecting rod, a link pivotally connected at each end to a reciprocating member, said powered device being connected to said link, means for shifting said frame and said sprocket to vary the angular displacement of the sprocket supported crank with respect to the other crank, and means on said link for varying the point of connection of the connecting means between the crank driven by said endless strand and said link, comprising a slot in said link having a projected dimension in a direction parallel to the movement of said frame and sprocket equal to π (pi) times the ecentricity of the crank supported thereon, and having a projected dimension normal to the first dimension equal to twice the eccentricity of said crank.

4. In a control mechanism for imparting variable reciprocating motion to a powered device where the amplitude of movement of said device is measured from a datum at one end of the stroke of such powered device for all amplitudes of movement thereof, a driving shaft and a driven shaft, a sprocket chain trained between said shafts, a crank mounted on said driving shaft, a sprocket engaging said sprocket chain between said driving and driven shafts, a frame for supporting said sprocket for movement between said shafts along an axis parallel to the line of centers of said shafts, a crank mounted on said sprocket, a connecting rod connected to each sprocket including an reciprocating member connected to each connecting rod, a link pivotally connected at each end to a reciprocating member, said powered device being connected to said link, means for shifting said frame and said sprocket to vary the angular displacement of the sprocket supported crank with respect to the other crank, and means on said link for varying the point of connection of the connecting means between the crank driven by said endless strand and said link.

5. In a control mechanism for imparting variable reciprocating motion to a powered device where the amplitude of movement of said device is measured from a datum at one end of the stroke of such powered device for all amplitudes of movement thereof, a driving shaft and a driven shaft, a sprocket chain trained between said shafts, a crank mounted on said driving shaft, a sprocket engaging said sprocket chain between said driving and driven shafts, means for supporting said sprocket for movement between said shafts, a crank mounted on said sprocket, a link including means for connecting spaced points on said link to said cranks, said powered device being connected to said link, means for shifting said supporting means to vary the angular displacement of the crank supported on said supporting means with respect to the other crank and means on said link for varying the point of connection of the connecting means between the crank driven by said sprocket chain and said link.

6. In a control mechanism for imparting variable reciprocating motion to a powered device where the amplitude of movement of said device is measured from a datum at one end of the stroke of such powered device for all amplitudes of movement thereof, a driving shaft and a driven shaft, a sprocket chain trained between said shafts, a crank mounted on said driving shaft, a sprocket engaging said sprocket chain between said driving and driven shafts, means for supporting said sprocket for movement between said shafts, a crank mounted on said sprocket, a link including means for connecting spaced points on said link to said cranks, said powered device being connected to said link, means for shifting said supporting means to vary the angular displacement of the crank supported on said supporting means with respect to the other crank and means on said link for varying the point of connection of the connecting means between the crank driven by said sprocket chain and said link, comprising a slot in said link having a projected dimension in a direction parallel to the movement of said sprocket supporting means equal to π (pi) times the eccentricity of the crank supported thereon, and having a projected dimension normal to the first dimension equal to two times the eccentricity of said crank.

7. In a control mechanism for imparting variable reciprocating motion to a powered device where the amplitude of movement of said device is measured from a datum at one end of the stroke of such powered device for all amplitudes of movement thereof, a driving shaft and a driven shaft, endless strand means trained between said shafts, a crank mounted on said driving shaft, means engaging said endless strand between said driving and driven shafts and rotated thereby, means for supporting said last named means for movement between said shafts, a crank mounted on said strand engaging means, a link including means for connecting spaced points on said link to said cranks, said powered device being connected to said link, means for shifting said supporting means to vary the angular displacement of the crank supported by said supporting means with respect to the other crank, and means on said link for varying the point of connection of the connecting means between the crank driven by said endless strand and said link, comprising a slot in said link having a projected dimension in a direction parallel to the movement of said supporting means equal to π (pi) times the eccentricity of the crank supported thereon, and having a projected dimension normal to the first dimension equal to two times the eccentricity of said crank.

8. In a control mechanism for imparting variable reciprocating motion to a powered device where the amplitude of movement of said device is measured from a datum at one end of the stroke of such powered device for all amplitudes of movement thereof, a driving shaft and a driven shaft, endless strand means trained between said shafts, a crank mounted on said driving shaft, means engaging said endless strand between said driving and driven shafts, means for supporting said last named means for movement between said shifts, a crank mounted on said strand engaging means, a link including means for connecting spaced points on said link to said cranks, said powered device being connected to said link, means for shifting said supporting means to vary the angular displacement of the crank supported by said supporting means with respect to the other crank, and means on said link for varying the point of connection of the connecting means between the crank driven by said endless strand and said link, said last named means including a point of connection of the means connecting said shiftable crank to said link which varies in a projected direction, a maximum distance equal to twice the eccentricity of one of said cranks and varies in another projected direction a distance equal to π (pi) times the eccentricity of said shiftable crank.

9. In a control mechanism for imparting variable reciprocating motion to a power device where the amplitude of movement of said device is measured from a datum at one end of the stock of such powered device for all amplitudes of movement thereof, a driving shaft and a driven shaft, endless strand means trained between said shafts, a crank mounted on said driving shaft, means engaging said endless strand between said driving and driven shafts, means for supporting said last named means for movement between said shafts, a crank mounted on said strand engaging means, a link including means for connecting spaced points on said link to said cranks, said powered device being connected to said link, means for shifting said supporting means to vary the angular displacement of the crank supported by said supporting means with respect to the other crank from 0° to 180° of displacement, and means on said link for varying the point of connection of the connecting means between the crank driven by said endless strand and said link.

10. In a control mechanism for imparting variable reciprocating motion to a powered device where the amplitude of movement of said device is measured from a datum at one end of the stroke of such powered device for all amplitudes of movement thereof, a driving shaft and a driven shaft, endless strand means trained between said shafts, a crank mounted on said driving shaft, means engaging said endless strand between said driving and driven shafts, means for supporting said last named means for movement between said shafts, a crank mounted on said strand engaging means, a link including means for connecting spaced points on said link to said cranks, said powered device being connected to said link, means for shifting said supporting means to vary the angular displacement of the crank supported on said supporting means with respect to the other crank, and means on said link for varying the point of connection of the connecting means between the crank driven by said endless strand and said link.

No references cited.